(12) United States Patent
Tomaj

(10) Patent No.: US 9,505,085 B2
(45) Date of Patent: Nov. 29, 2016

(54) LASER WEAKENING OF LEATHER SKINS

(71) Applicant: Magna Interiors (Europe) GMBH, Munich (DE)

(72) Inventor: Anton Tomaj, Esslingen (DE)

(73) Assignee: MAGNA INTERIORS (EUROPE) GMBH, Munich (DE)

( * ) Notice: Subject to any disclaimer, the term of this patent is extended or adjusted under 35 U.S.C. 154(b) by 0 days.

(21) Appl. No.: 13/992,284

(22) PCT Filed: Sep. 17, 2012

(86) PCT No.: PCT/DE2012/200063
§ 371 (c)(1),
(2) Date: Jun. 7, 2013

(87) PCT Pub. No.: WO2013/056707
PCT Pub. Date: Apr. 25, 2013

(65) Prior Publication Data
US 2015/0108691 A1 Apr. 23, 2015

(30) Foreign Application Priority Data

Oct. 17, 2011 (DE) .................. 10 2011 116 010
Oct. 21, 2011 (DE) .................. 10 2011 116 542

(51) Int. Cl.
| | |
|---|---|
| B23K 26/00 | (2014.01) |
| B23K 26/386 | (2014.01) |
| B23K 26/402 | (2014.01) |
| B23K 26/364 | (2014.01) |
| B23K 26/53 | (2014.01) |
| B23K 26/359 | (2014.01) |
| B23K 26/38 | (2014.01) |
| B23K 26/40 | (2014.01) |

(52) U.S. Cl.
CPC ......... *B23K 26/0087* (2013.01); *B23K 26/359* (2015.10); *B23K 26/364* (2015.10); *B23K 26/386* (2013.01); *B23K 26/402* (2013.01); *B23K 26/53* (2015.10); *B23K 2203/34* (2015.10)

(58) Field of Classification Search
CPC B23K 26/53; B23K 23/359; B23K 26/0087; B23K 26/0408; B29C 37/0057
See application file for complete search history.

(56) References Cited

U.S. PATENT DOCUMENTS

| | | | |
|---|---|---|---|
| 3,419,706 A | * | 12/1968 | Lohrmann ........... B23K 26/402 219/121.6 |
| 6,294,124 B1 | | 9/2001 | Bauer |
| 6,337,461 B1 | | 1/2002 | Yasuda et al. |
| 7,297,897 B2 | | 11/2007 | Nicholas et al. |
| 2003/0127836 A1 | | 7/2003 | Baudouin |
| 2004/0183280 A1 | | 9/2004 | Batchelder et al. |

(Continued)

FOREIGN PATENT DOCUMENTS

| | | |
|---|---|---|
| DE | 19910141 A1 | 9/2000 |
| DE | 19944371 A1 | 3/2001 |

(Continued)

*Primary Examiner* — Jeffrey Wollschlager
*Assistant Examiner* — Armand Melendez
(74) *Attorney, Agent, or Firm* — Banner & Witcoff, Ltd.

(57) ABSTRACT

A method for producing a linear weakening in a flat decorative material having a point-like or spot-like area of action progressing along a machining direction of a laser light beam on the decorative material. The decorative material is set transversely with respect to the machining direction in the area of action in order to obtain a different weakening depth profile on the left and right of the weakening line predefined by the machining direction.

8 Claims, 2 Drawing Sheets

(56) References Cited

U.S. PATENT DOCUMENTS

| | | |
|---|---|---|
| 2005/0104337 A1 | 5/2005 | Merrifield et al. |
| 2007/0207233 A1* | 9/2007 | Bauer .................. B23K 26/03 425/141 |
| 2009/0049799 A1* | 2/2009 | Pastrana Rojas .. B23K 26/0846 53/133.6 |
| 2009/0302579 A1* | 12/2009 | Lippert .................... B23C 3/30 280/728.1 |
| 2010/0206859 A1* | 8/2010 | Nakai .................... B23K 26/08 219/121.72 |

FOREIGN PATENT DOCUMENTS

| | | |
|---|---|---|
| DE | 10241715 A1 | 3/2004 |
| EP | 1745989 A2 | 1/2007 |
| JP | 2001315608 * | 11/2001 |

* cited by examiner ations in FIGS.
LASER WEAKENING OF LEATHER SKINS

CROSS-REFERENCE TO RELATED APPLICATIONS

The present application is a National Stage Application of PCT International Application No. PCT/DE2012/200063 (filed on Sep. 17, 2012), under 35 U.S.C. §371, which claims priority to German Patent Application Nos. DE 10 2011 116 010.1 (filed on Oct. 17, 2011) and DE 10 2011 116 542.1 (filed on Oct. 21, 2011), which are each hereby incorporated by reference in their complete respective entireties.

TECHNICAL FIELD

The present invention relates to a method for making a linear or strip-like weakening in a flat and preferably flexible decorative material and in particular a method for making a linear or strip-like weakening in a piece of leather or a synthetic skin.

BACKGROUND

Various widely used methods for producing a linear or strip-like material weakening in decorative materials by means of laser light beams are known. The factor common to these methods is that a decorative material is machined with a high-energy laser light beam from the reverse side, which is subsequently hidden, additional measures being taken to prevent the machining penetrating to the visible side of the decorative material. Such a widely used method is disclosed, for example, by the official publication U.S. Pat. No. 7,297,897 A and U.S. Pat. No. 6,294,124 B1.

Further methods for producing a weakening with the least possible marking on the decorative surface and, in particular, machining techniques that can be applied thereto, are disclosed by the publications DE 199 44 371 A1, EP 1 745 989 A2 and DE 102 41 715 A1.

Despite careful application, with the widely known methods the weakening produced can cause marking on the visible side under unfavorable environmental conditions, which is viewed as an aesthetic disadvantage of the product.

SUMMARY

Against this background, the invention has the object of specifying a method for laser weakening of decorative materials and in particular leather and synthetic skins which delivers an improved visual appearance of the visible side.

In order to achieve this object, the invention proposes two different methods having the features respectively specified herein.

Expedient refinements and developments of the methods according to the invention are specified in the dependent sub-claims.

DRAWINGS

A commonly preferred implementation of the two methods according to the invention will be explained below with reference to the appended schematically simplified sketches, in which.

DESCRIPTION

Figure 1:
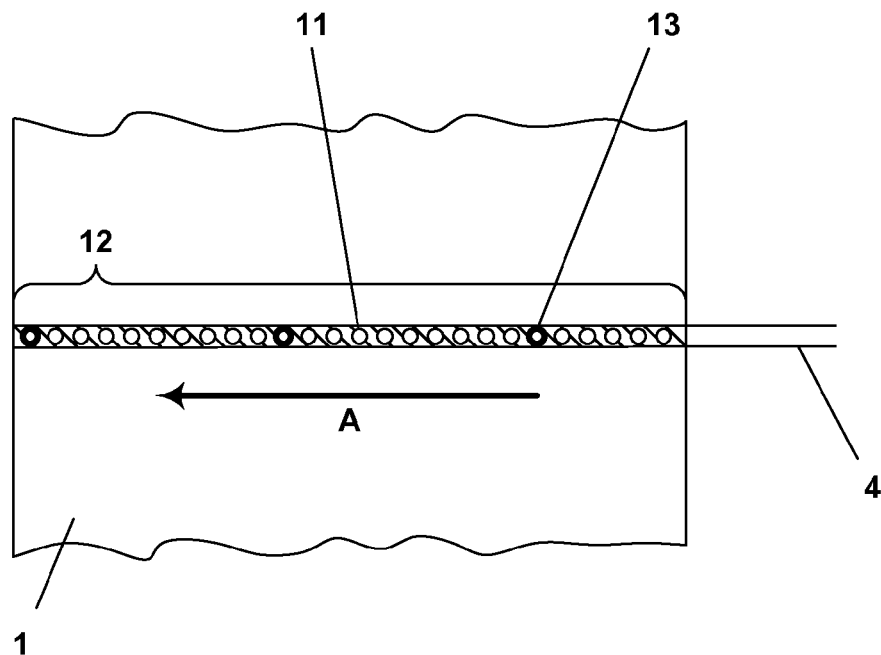
FIG. 1 illustrates a simplified schematic representation of a plan view of a piece of a decorative material weakened by applying a first implementation of a method according to the invention.
Figure 2:
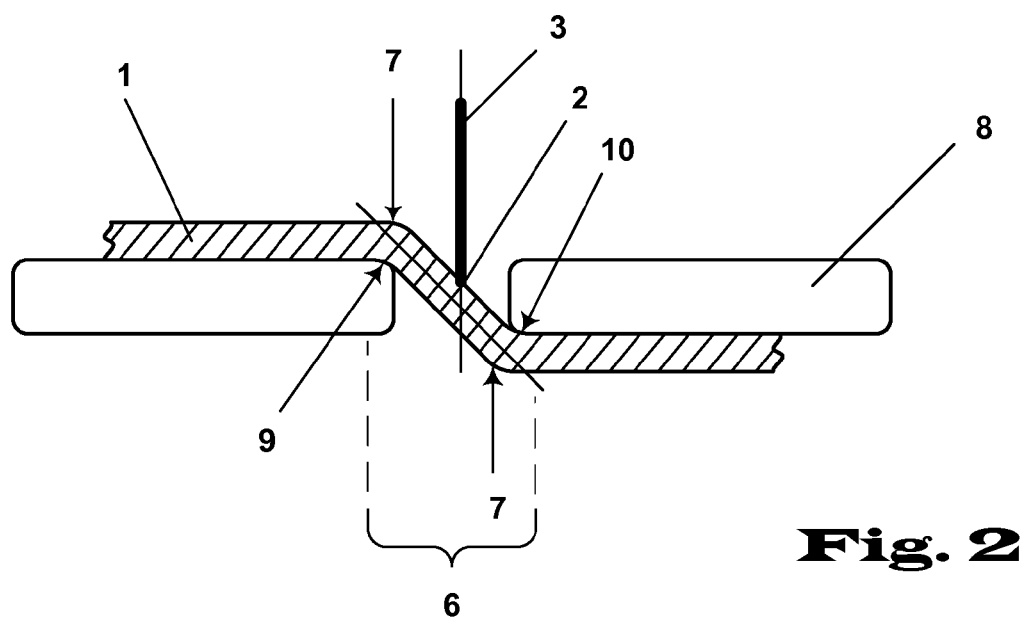
FIG. 2 illustrates a lateral sectional view of an arrangement for realizing the first preferred implementation of a method according to the invention.

In accordance with the schematic representations in FIGS. 1 and 2, a linear weakening, a weakening line 4 or, expressed quite exactly, a weakening strip is made in a piece of a flat decorative material 1 in the manner of a row of individual holes 11. The holes 11 were produced by the instantaneous action of a laser light beam 3 on one side of the surface of the decorative material 1 that is visible in the drawing. A decorative material 1 machined in such a way is typically processed further to form a visible-side decorative covering over an opening flap of an airbag compartment in a vehicle inner trim part. In this context, the weakening line 4 fulfils the function of an intended rupture point and a tearing line during triggering and deployment of the airbag stowed underneath. To this extent, in a particularly preferred application, the decorative material 1 is an appropriately tailored piece of leather or synthetic skin. Alternatively, the decorative material can also be a piece of fabric or of an ornamental nonwoven.

The discrete hole pattern illustrated in FIG. 1 with a row 12 of approximately equally spaced holes 11 corresponds to the typical discontinuous machining. In this case, the position of the area of action 2 of the laser light beam 3 is fixed during the action. On the other hand, during the re-positioning of the workpiece, i.e. the decorative material 1, the action of the laser light beam 3 is interrupted. As a result, the area in the connecting line of adjacent holes 11 remains un-machined. The area of action 2 of the laser light beam 3 during the discontinuous machining so to speak jumps forward along the machining direction A from hole 11 to hole 11. This discontinuous machining can be implemented very easily with the currently widely used laser light sources, since, as a result of the design thereof, these do not emit a continuous beam but a controllable sequence of laser light pulses.

Likewise, in the widely used methods, in the situation described the side of the point of action 2 of the laser light beam 3 is opposite the intended visible side of the decorative material 1. This corresponds to machining from the reverse side. In addition, the holes 11 are preferably formed as blind holes, in order to avoid any impairment to the appearance of the visible side of the decorative material. In the case of a pulsed laser light source, the depth of the blind holes 11 can to some extent be realized repeatedly accurately by a pre-defined number of laser light pulses of predefined energy acting on the decorative material 1 in one position. Nevertheless, during the progress of the machining, repeated adaptation of the input of energy is recommended. This is achieved by the production of intermittent reference holes 13. Here, the actual machining depth is determined from the light intensity of the laser light beam 3 emerging through the residual material thickness at the base of the hole 11, and the number of pulses and/or the pulse energy provided for the machining is/are re-defined in order to achieve a target machining depth. As a result of this regular re-calibration of the machining, it is possible to compensate for density, reflectance and thickness variations of the decorative material 1 along the machining line. This is a considerable advantage in particular when machining leather.

The difference of the method according to the invention from the widely used weakening methods can primarily be inferred with a glance at FIG. 2, which illustrates a preferred arrangement for realizing a preferred implementation. This comprises a laser light source shining in from above but not illustrated in detail and a holding device 8 for the decorative material 1. The latter is arranged between two opposite supporting edges 9, 10 of the holding device 8. On account of the offset of the supporting edges 9, 10 in the direction of the laser light beam 3, a double fold 6 is formed along the machining direction A running into the plane of the drawing. The position of said double fold is chosen such that the area of action 2 of the laser light beam 3 is located between and preferably centrally between the folds 7.

As a result of the alignment of the supporting edges 9, 10 in relation to the direction of incidence of the laser light beam 3, the central fiber of the decorative material 1, located in the section plane and indicated by the oblique line, is clearly set at an angle transversely with respect to the machining direction A. The direction of incidence of the laser light beam 3 on this central fiber is therefore not perpendicular, as in the widely used methods, but differs considerably from the 90° angle. As a result, the weakening introduced into the decorative material 1 along the beam direction of the laser light beam 3 is asymmetrical in relation to the central plane predefined by the centre lines of the visible holes 11. On the left-hand side of this central plane, the weakening is accordingly formed smaller than on the right-hand side. The reason for this is that the holes running obliquely move further away from the left-hand side area with increasing depth. The weakening depth profile that can be determined perpendicular to the surface of the decorative material 1 accordingly differs on the left-hand and right-hand side of the weakening line 4. As a result of the different weakening depth profile, the result under tensile loading is a transverse stress component running perpendicular to the surface of the decorative material 1, which counteracts any visible deformation on the surface.

Figure 3:
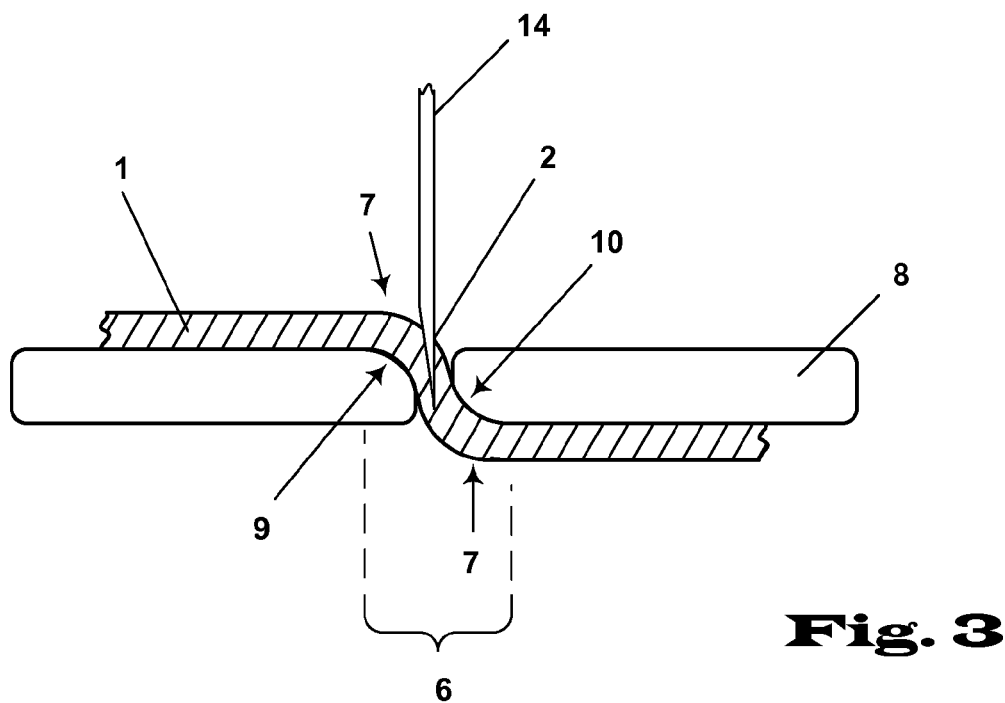
FIG. 3 illustrates a lateral sectional view of an arrangement for realizing a second preferred implementation of a method according to the invention.
Figure 4:
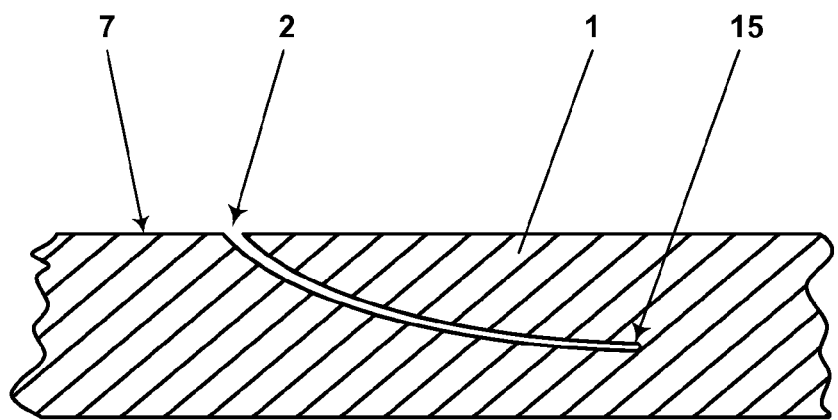
FIG. 4 illustrates a schematic detailed sectional view of a weakening strip in a decorative material.

As an alternative to the preferred implementation described previously, the methods according to the invention explained therein can also be realized in a device having mechanical machining tools. This is illustrated schematically by FIGS. 3 and 4 for machining with a cutting wheel 14. The decorative material is arranged in the same way as described previously in a holding device 8, forming a double fold 6 including the machining area. From the side pointing upwards, an incomplete cut is produced with a cutting wheel 14. During the machining, the cutting wheel 14 moves along the machining direction into the plane of the drawing.

As a result of the narrow angle between cutting wheel 14 and central fiber of the decorative material, a curved cut 15 running into the depth of the material toward one side of the weakening line results. The contour of said cut is represented by the enlarged partial sectional view in FIG. 4. The exact course of the cut 15 results from the folding of the decorative material 1 in the holding device 8. Depending on the course of the weakening line and the thickness and flexibility of the decorative material, it may be worth recommending fixing the decorative material in a narrow gap in the holding device 8, in order to ensure a uniform contour of the cut 15. During continuous processing, the parts of the holding device 8 illustrated on the left and right can be formed as transport rollers. In this modification, the cutting wheel 14 would remain fixed in relation to the holding device 8. The cut 15 would be effected in the machining direction only by the advance of the decorative material 1 between the transport rollers.

What is claimed is:

1. A method for producing a linear weakening in a flat decorative material machined to form a visible side decorative covering over an opening flap of an airbag compartment in a vehicle inner trim part wherein said flat decorative material has an area of action progressing along a machining direction, comprising:
   setting the flat material transversely with respect to the machining direction in the area of action in order to obtain a different weakening depth profile on a left side and a right side of a weakening line predefined by the machining direction;
   machining the flat material with a laser light beam,
   wherein the flat decorative material is arranged between two opposite supporting edges of a holding device wherein said two opposite supporting edges are offset in the direction of the laser light beam such that the decorative material is at an angle with respect to the machining direction to form an asymmetric weakening through the material, and
   wherein a double fold is formed along the machining direction including the area of action in the flat decorative material.

2. The method of claim 1, further comprising obtaining a different weakening depth profile on the left side and the right side of the weakening line predefined by the machining direction.

3. The method of claim 1, further comprising forming a row of holes in the flat, decorative material using a discontinuously progressing area of action.

4. The method of claim 3, wherein the row of holes comprise blind holes reaching toward a visible side of the flat material and open toward a rear side of the flat material.

5. The method of claim 3, wherein each hole in the row of holes is produced by the action of a predefined number of laser light pulses having a respectively predefined energy.

6. The method of claim 5, further comprising repeatedly producing reference holes within the row of holes for which a number and/or energy of the laser light pulses acting is controlled to a predefined machining result.

7. The method of claim 6, wherein the machining result is predefined as a machining depth or a residual wall thickness.

8. The method of claim 1, wherein the flat material comprises a leather or a synthetic material.

* * * * *